US010207794B1

(12) United States Patent
Beckman et al.

(10) Patent No.: US 10,207,794 B1
(45) Date of Patent: *Feb. 19, 2019

(54) AERIAL VEHICLE CENTER OF GRAVITY ADJUSTMENT

(71) Applicant: Amazon Technologies, Inc., Seattle, WA (US)

(72) Inventors: Brian C. Beckman, Newcastle, WA (US); Brandon William Porter, Yarrow Point, WA (US); Gur Kimchi, Bellevue, WA (US); Daniel Buchmueller, Seattle, WA (US); Jeffrey P. Bezos, Seattle, WA (US); Frederik Schaffalitzky, Kirkland, WA (US); Amir Navot, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,639

(22) Filed: Dec. 13, 2016

Related U.S. Application Data

(63) Continuation of application No. 14/491,201, filed on Sep. 19, 2014, now Pat. No. 9,550,561.

(60) Provisional application No. 62/036,073, filed on Aug. 11, 2014.

(51) Int. Cl.
*B64C 17/00* (2006.01)
*G05D 3/00* (2006.01)
*B64C 39/02* (2006.01)
*G01M 1/12* (2006.01)

(52) U.S. Cl.
CPC ............ *B64C 17/00* (2013.01); *B64C 39/024* (2013.01); *G01M 1/127* (2013.01); *G05D 3/00* (2013.01); *B64C 2201/027* (2013.01); *B64C 2201/108* (2013.01); *B64C 2201/128* (2013.01)

(58) Field of Classification Search
CPC . B64C 17/00; B64C 39/024; B64C 2201/027; B64C 2201/108; B64C 2201/128; G01M 1/127; G05D 3/00
USPC ....................................................... 701/124
See application file for complete search history.

(56) References Cited

U.S. PATENT DOCUMENTS

| 2,872,807 | A | 2/1959 | Kolisch |
|---|---|---|---|
| 2,987,254 | A | 6/1961 | Kolisch |
| 3,584,503 | A | 6/1971 | Senour |
| 4,622,639 | A | 11/1986 | Adelson et al. |
| 4,935,885 | A | 6/1990 | McHale et al. |
| 5,548,517 | A | 8/1996 | Nance |
| 5,571,953 | A | 11/1996 | Wu |
| 5,583,777 | A | 12/1996 | Power |
| 6,308,131 | B1 | 10/2001 | Fox |

(Continued)

*Primary Examiner* — Atul Trivedi
(74) *Attorney, Agent, or Firm* — Athorus, PLLC

(57) ABSTRACT

This disclosure describes a system and method for determining the center of gravity of a payload engaged by an automated aerial vehicle and adjusting components of the automated aerial vehicle and/or the engagement location with the payload so that the center of gravity of the payload is within a defined position with respect to the center of gravity of the automated aerial vehicle. Adjusting the center of gravity to be within a defined position improves the efficiency, maneuverability and safety of the automated aerial vehicle. In some implementations, the stability of the payload may also be determined to ensure that the center of gravity does not change or shift during transport due to movement of an item of the payload.

20 Claims, 10 Drawing Sheets

(56) References Cited

U.S. PATENT DOCUMENTS

| | | | |
|---|---|---|---|
| 6,353,793 B1 | 3/2002 | Godwin et al. | |
| 6,808,144 B1 * | 10/2004 | Nicolai | B64C 39/024 244/139 |
| 8,515,627 B2 | 8/2013 | Marathe et al. | |
| 8,543,322 B1 | 9/2013 | Nance | |
| 8,909,437 B2 * | 12/2014 | Zhu | E02F 3/435 701/124 |
| 9,205,922 B1 | 12/2015 | Bouwer | |
| 9,550,561 B1 * | 1/2017 | Beckman | B64C 17/00 |
| 9,856,016 B2 * | 1/2018 | Mueller | B64C 27/20 |
| 9,902,490 B2 * | 2/2018 | Beckman | B64C 11/00 |
| 9,902,491 B2 * | 2/2018 | Chan | B64C 27/08 |
| 9,908,618 B2 * | 3/2018 | Vaughn | A63H 27/12 |
| 2002/0099497 A1 | 7/2002 | Godwin et al. | |
| 2005/0232747 A1 | 10/2005 | Brackmann et al. | |
| 2005/0246057 A1 | 11/2005 | Olin et al. | |
| 2005/0246132 A1 | 11/2005 | Olin et al. | |
| 2006/0038077 A1 | 2/2006 | Olin et al. | |
| 2007/0200027 A1 * | 8/2007 | Johnson | B64C 39/022 244/3.1 |
| 2008/0131248 A1 | 6/2008 | Friz et al. | |
| 2009/0112535 A1 | 4/2009 | Phillips | |
| 2009/0152391 A1 | 6/2009 | McWhirk | |
| 2010/0100225 A1 | 4/2010 | Reed et al. | |
| 2010/0114468 A1 | 5/2010 | Field et al. | |
| 2010/0123042 A1 | 5/2010 | Ballard et al. | |
| 2010/0198492 A1 | 8/2010 | Watanabe | |
| 2011/0022267 A1 | 1/2011 | Murphy | |
| 2011/0084162 A1 | 4/2011 | Goossen et al. | |
| 2012/0041639 A1 | 2/2012 | Followell et al. | |
| 2012/0116660 A1 | 5/2012 | Sendlinger et al. | |
| 2012/0221235 A1 | 8/2012 | Prudhomme-Lacroix et al. | |
| 2013/0050467 A1 | 2/2013 | Wharton | |
| 2014/0217230 A1 * | 8/2014 | Helou, Jr. | B64C 25/14 244/17.17 |
| 2015/0158576 A1 * | 6/2015 | Jones | B64C 19/02 701/2 |
| 2015/0210392 A1 | 7/2015 | Hodge et al. | |
| 2016/0107751 A1 * | 4/2016 | D'Andrea | B64C 27/20 701/4 |
| 2016/0159472 A1 * | 6/2016 | Chan | B64C 27/08 244/39 |
| 2016/0264234 A1 * | 9/2016 | Vaughn | A63H 27/12 |
| 2016/0340006 A1 * | 11/2016 | Tang | B63C 9/01 |
| 2016/0376031 A1 * | 12/2016 | Michalski | B64F 1/36 701/15 |
| 2017/0274993 A1 * | 9/2017 | Beckman | B64C 39/024 |
| 2018/0016027 A1 * | 1/2018 | Cheatham, III | B64D 45/00 |

* cited by examiner

AERIAL VEHICLE CENTER OF GRAVITY ADJUSTMENT

CROSS-REFERENCE TO RELATED APPLICATIONS

This application claims priority to U.S. application Ser. No. 14/491,201, filed Sep. 19, 2014, entitled "Determining Center of Gravity of an Automated Aerial Vehicle and a Payload," and U.S. Application No. 62/036,073, filed Aug. 11, 2014, entitled "Determining Center of Gravity of an Automated Aerial Vehicle and a Payload," both of which are incorporated herein by reference in their entirety.

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers and other product distributors (which may collectively be referred to as distributors) typically maintain an inventory of various items that may be ordered by clients or customers. This inventory may be maintained and processed at a materials handling facility, such as a warehouse, distribution center, etc.

To deliver these products to the customers, agents working within the materials handling facility pick the items from storage, pack the items in one or more containers and have the items shipped or transported to a customers designated location. Because different items vary in size, shape and weight, the location of the center of gravity of each container varies greatly depending on the contents and/or how those contents are placed in the container.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
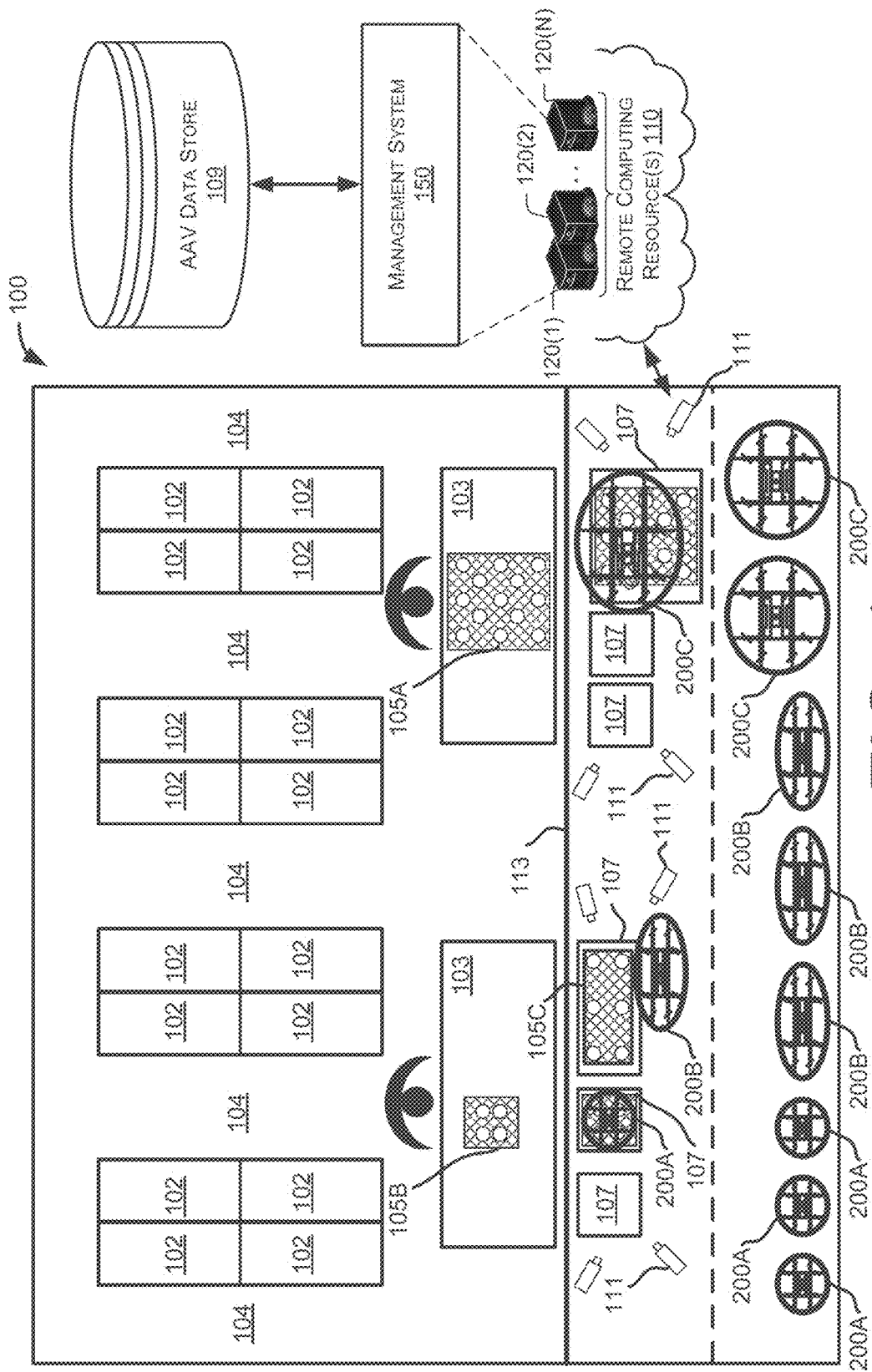
FIG. 1 is a block diagram illustrating a top-down view of a storage area, packing area and engagement area within a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and method for utilizing an automated aerial vehicle ("AAV") for transporting a payload. As part of the payload engagement, the center of gravity of the payload may be determined and adjustments made to the payload, the AAV and/or the location of engagement between the AAV and the payload so that the center of gravity of the payload is within a defined distance of the center of gravity of the AAV and/or so that the combined center of gravity of the AAV and the engaged payload is within a defined position with respect to the AAV.

Adjusting the center of gravity of the payload, the AAV and/or the combined center of gravity of the payload and the AAV is beneficial for flight control, maneuverability, safety, and power efficiency. For example, if the center of gravity of the payload is offset with respect to the AAV, one or more of the motors of the AAV will have to rotate the propellers faster to compensate for the distribution of weight, resulting in an inefficient use of power.

In addition to determining the center of gravity, in some implementations, the mass distribution of the payload may also be determined and flight characteristics of the AAV may be adjusted based on the mass distribution of the payload, the mass distribution of the AAV, and/or the combined mass distribution of the payload and the AAV. For example, if the payloads for two AAVs (AAV-1, AAV-2) are each ten pounds and the center of gravity for each payload is within a defined position with respect to the AAVs, the flight controls of the AAVs may be different for different mass distributions of the payloads. For example, AAV-1 may be carrying a ten-pound ball with a two-inch diameter and AAV-2 may be carrying a ten-pound plate with a twenty-four inch diameter. Because the mass distribution of the two payloads are different, the agility and maneuverability of the AAVs will be different due to the different mass distributions and corresponding differences in moments of inertia. Specifically, AAV-1 will be more agile than AAV-2. In such examples, the flight control parameters for the AAV may be adjusted based on the different determined mass distributions.

In some implementations, the stability of the payload may also be determined prior to transport of the payload. For example, if the payload is an item (or group of items) packed in a container, it may be determined whether the items in the container may shift during transport, thereby potentially altering the center of gravity of the payload. If the payload is determined to be unstable (i.e., the items of the payload shift with movement), the payload may be rejected and a request may be issued to repackage the payload and/or utilize a different transport mechanism, e.g., a ground carrier.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling. A "payload," as used herein, is any item or group of items that can be engaged and transported by an AAV and/or any container in which an item or group of items may be placed. For example, a payload may be a group of items packaged in a container that is engaged by the AAV and transported. Alternatively, the payload may be the item itself, absent of any container or other packaging.

FIG. 1 is a block diagram illustrating a top down view of a storage area 100 within a materials handling facility configured to store inventory items, according to some implementations. As shown, the storage area 100 includes bays 102 for storing inventory items. Any number, type and/or size of bays may be included in the storage area. A bay may be a shelf, series of shelves and/or any other location where items are stored. As shown, multiple bays 102 may be arranged adjacent to one another and/or across from one another to establish a series of rows 104 within the storage area 100. In this example, the bays 102 are arranged in rows 104 so that an agent may progress through the rows picking items from bays on either side of the row. For example, an agent may progress through the rows 104, pick items from the bays 102, and/or store items in the bays 102.

In various implementations, any number of storage areas 100 may be located throughout a given materials handling facility. Such storage areas 100 may be located on different floors and in some instances may be organized in a "stacked" configuration. For example, in an area of the materials handling facility that has a high ceiling, a structure consisting of different levels of storage areas may be utilized and accessed by agents using stairs or other means to move between the levels. In some instances, such a structure may be open on one end with safety barriers for agents but may otherwise allow access (e.g., by an AAV) to the different levels and/or AAV engagement locations, as will be described in more detail below. Likewise, in some implementations, a safety barrier may be positioned between sections of the storage area to separate sections that are accessible by agents from sections that accessible by AAVs.

The materials handling facility may be configured to receive different kinds of inventory items from various suppliers, vendors, etc., and to store those items until a customer orders or requests one or more of the items. In various implementations, items may include merchandise, commodities, perishables, or any suitable type of item depending on the nature of the enterprise that operates the materials handling facility.

Upon being received from a supplier, items may be prepared for storage in the storage area 100. For example, in some implementations, items may be unpacked or otherwise rearranged, and a materials handling facility management system 150 (which, as described below, may include one or more software applications executing on a computer system) may be updated to reflect the type, weight, size, center of gravity, quantity, condition, cost, location or any other suitable parameters with respect to newly received items.

After arriving and being prepared for storage, items may be stored within the storage area 100. In some implementations, like items (e.g., identical versions of the same item that may be utilized interchangeably to fulfill an order for the item) may be stored or displayed together in one or more bays, or adjacent bays, such that all items of a given kind are stored in one location. In other implementations, like items may be stored in different locations; for example, to optimize retrieval of certain items having high turnover within a large physical facility, those items may be stored in several different bays throughout the storage area 100 to reduce congestion that might occur at a single point of storage. Like items may also be stored in different locations for other reasons (e.g., more convenient processing for storing the items, greater efficiency for the storage and/or picking processes, etc.).

When a customer order specifying one or more items is received, the corresponding items may be selected or "picked" from a bay within the storage area 100. In various implementations, item picking may range from manual to completely automated picking. In other implementations, materials handling facility employees (agents) may pick items using written or electronic pick lists derived from customer orders and place picked items into a tote, cart, etc., as the materials handling facility agent progresses through the storage area 100.

After items are picked, they are delivered to an operating location 103. At the operating location 103, an agent may pack the items into a container 105. Depending on the size and quantity of items to be packaged, different sizes of containers may be utilized. For example, container 105A illustrates a large container for containing larger items and/or multiple items, container 105B illustrates a smaller container for containing smaller items and/or fewer items, and container 105C illustrates a container for containing odd shaped or longer items. Any variety of sizes and/or shapes of containers may be utilized with the implementations discussed herein. Likewise, in some implementations, different configurations of containers may be available at different operating locations 103. In such an implementation, as items are picked by an agent, they may be routed to an operating location based on the characteristics (e.g., size, weight) of the item and the containers available at the operating location 103. Container configurations will be discussed in further detail below with respect to FIG. 3.

The storage area 100 may also include and/or be in communication with the materials handling facility management system 150 that is configured to receive and/or provide information to agents, AAVs, and/or other entities within the storage area 100 or other areas of the materials handling facility. Generally, the materials handling facility management system 150 may include one or more communication devices that facilitate wireless communication (e.g., Wi-Fi, NFC, Bluetooth) between the materials handling facility management system 150 and one or more AAVs 200 (e.g., as will be described in more detail below with respect to FIGS. 2 and 4).

The materials handling facility management system 150 may be implemented on one or more computing resources. The computing resources may be local and/or remote. As illustrated, the materials handling facility management system 150 is implemented on remote computing resources 110, which may include one or more servers 120(1), 120(2), . . . , 120(N) and may, in some instances, form a portion of a network-accessible computing platform implemented as a computing infrastructure of processors, storage, software, data access, etc. The remote computing resources 110 do not require end-user knowledge of the physical location and configuration of the system that delivers the services. Common expressions associated with the remote server system 120 include "on-demand computing," "software as a service (SaaS)," "platform computing," "network-accessible platform," "cloud services," "data centers," and so forth.

The remote computing resources 110 may also include an AAV data store 109 and/or other data stores. As discussed further below, the data stores may include lists, arrays, databases, and other data structures used to provide storage and retrieval of data. In some implementations, the data stores may be configured as a single data store or multiple data stores.

In various implementations, the AAV data store 109 may include stored information related to different AAV configurations (e.g., size, weight, center of gravity), payload capabilities, power availability, flight control parameters, etc. For example, in some implementations, the materials handling facility may include multiple different AAV 200 configurations. Each of the different AAVs may be designed to transport payloads with different characteristics and/or to transport payloads into different types of delivery areas, such as dense areas (e.g., apartment buildings) and/or remote areas, thereby requiring additional power.

Any number of AAVs and AAV configurations may be utilized within a materials handling facility. In the example illustrated in FIG. 1, there are three different AAV configurations 200A, 200B, 200C. AAV 200A, a smaller AAV, may be designed to be very agile, due to its smaller size, to transport smaller payloads, such as payloads contained in container 105B and/or to deliver payloads in dense delivery areas. AAV 200B, a longer AAV, may be designed to be carry odd shaped payloads, such as those contained in container 105C. AAV 200C, a larger AAV, may be designed to carry larger and/or heavier payloads, such as those contained in container 105A.

In some implementations, one or more of the AAVs 200 may further be configurable to adjust to the different payloads. For example, the payload engagement element of the AAV (discussed further below) may be adjustable to reposition a payload with respect to the AAV. Other components of the AAVs 200, such as the motor arms, power supplies, counterweights, etc., may also be adjustable.

The AAV data store 109 may be integrated with the materials handling facility management system 150 or otherwise communicatively coupled with the materials handling facility management system 150. For example, the AAV data store 109 may be located at a remote computing resource and communicatively coupled with the server system 120 that implements the materials handling facility management system 150. In some implementations, the AAV data store 109 may include one or more CD-RW/DVD-RW drives, hard disk drives, solid-state drives, optical drives, tape drives, or other storage devices that are utilized to store digital content and information.

The materials handling facility management system 150 may utilize antennas within the materials storage area 100 of the materials handling facility to create a local wireless network (e.g., Wi-Fi) so that an AAV 200 can connect to and communicate with the materials handling facility management system 150. Likewise, in instances when one or more of the components of the materials handling facility management system 150 are remote from the materials handling facility and/or the storage area 100, those components may communicate with other components of the materials handling facility management system 150 and/or the AAV 200 via a network.

The organization and operation of the storage area 100 within a materials handling facility described above is given as an example. In other implementations, a materials handling facility and/or storage area may be arranged differently and operate differently than described above.

As discussed in more detail below, as payloads are prepared at an operating location 103, they may be transitioned by an agent to an AAV engagement location 107. In some implementations, there may be a barrier 113 or partition that separates the operating location 103 and/or the agent from the AAV engagement location 107. For example, the barrier 113 may be a fence or glass wall separating the operating location 103 from the AAV engagement location 107. The barrier may include one or more transition openings or doors through which a payload may be moved from the operating location 103 to the AAV engagement location 107. In other implementations, one or more conveyors may be used to move payloads from an operating location to the AAV engagement location. Likewise, while the operating location 103 and the AAV engagement location are illustrated in FIG. 1 as adjacent, in other implementations, the operating location 103 and the AAV engagement location 107 may be separated by any distance within the materials handling facility.

When a payload is positioned at the AAV engagement location 107, it is ready for engagement by an AAV and the materials handling facility management system 150 may send instructions to an appropriately configured AAV 200 to navigate to the AAV engagement location 107 and engage the payload. As part of the engagement, the center of gravity of the payload may be determined. The center of gravity may be a point located in a three dimensional space with respect to the payload and/or the AAV.

In one implementation, the center of gravity may be determined before the AAV 200 engages the payload. For example, the center of gravity of the payload may be determined utilizing one or more sensors located at the AAV engagement location 107. Each AAV engagement location 107 may include three or more sensors (e.g., load cells, scales, pressure sensors and/or other mass measurement devices). The payload may be placed on the sensors and the force and/or mass measured at each sensor may be utilized to compute horizontal dimensions of the center of gravity of the payload.

In some implementations, the AAV engagement location 107 may also be configured to rotate about one or more axes. In addition to measuring the horizontal dimensions of the center of gravity using sensors of the AAV engagement location 107, the AAV engagement location 107 may be rotated about an axis and used to measure a vertical dimension of the center of gravity of the payload. Alternatively, the vertical dimension of the center of gravity of the payload may be determined after the AAV engages the payload. For example, the AAV may be instructed to engage the payload, lift the payload, move, shake, rotate, etc., the payload (e.g., by altering the pitch, yaw and/or roll of the AAV). Based on the rotational movement of the payload, the vertical dimension of the center of gravity (as well as the horizontal dimensions), of the payload may be determined.

As discussed below, based on the determined center of gravity of the payload, one or more adjustments may be made to alter the position of the center of gravity of the payload, alter the engagement location between the AAV 200 and the payload and/or alter the center of gravity of the AAV.

In other implementations, the center of gravity of the payload may be determined after the AAV 200 has engaged the payload. For example, the AAV 200 may engage and land on the payload and/or land at the AAV engagement location 107 and the combined center of gravity of the AAV and the payload may be determined using sensors located at the AAV engagement location 107. Alternatively, or in addition thereto, the AAV may engage the payload, lift the payload from the AAV engagement location and hover or loiter above the AAV engagement location in an approximately stationary and level position. As the AAV hovers with the engaged payload, a center of gravity (COG) adjustment controller 413 (FIG. 4) may determine the rotational speed of each motor of the AAV that is being used to keep the AAV stationary and level. For example, the center of gravity adjustment controller 413 may receive rotational speed information from each of the electronic speed controls (ESC) that are used to control each motor. Based on the different rotational speeds utilized to keep the AAV and the engaged payload approximately stationary and level, the center of gravity of the payload and/or the combined center of gravity of the payload and the AAV may be determined.

In still another implementation, one or more cameras 111 may be positioned around the AAV engagement location 107, or at another defined location. As the AAV lifts the payload, the cameras may be used to determine pitch and/or roll of the AAV resulting from the engaged payload. For example, the AAV 200 may engage the payload and then proceed to lift the payload, applying equal rotational speed to all of the motors and/or a known rotational speed to each motor that is needed to keep the AAV level during flight with no engaged payload. If the center of gravity of the payload is not positioned directly under the AAV, as the AAV lifts the payload, the pitch and/or roll of the AAV will change. The cameras 111 may be used to capture images of the AAV that are processed to determine the direction and/or degree of change in the pitch and/or roll of the AAV as it lifts the payload.

In still another implementation, rather than or in addition to using the cameras 111 to determine the change in the pitch and/or roll of the AAV, one or more inertial sensors (e.g., accelerometer) may be included on the AAV that are configured to determine a change in the pitch and/or roll of the AAV. As discussed below, based on the determined center of gravity of the payload, one or more adjustments may be made to alter the position of the center of gravity of the payload, to alter the engagement location between the AAV 200 and the payload and/or to alter the center of gravity of the AAV.

To improve the measurement and determination of the center of gravity based on the measured rotational speed of the motors and/or based on the determined change in the pitch and/or roll of the AAV, other external forces may be reduced. For example, the location used for lifting the payload and measuring the motor speeds and/or the change in pitch and/or roll may be done in a semi-controlled or controlled environment (e.g., inside a materials handling facility) to reduce the external force of wind that may influence the speed of the motors and/or the resulting pitch and/or roll of the AAV.

In some implementations, rather than or in addition to measuring the center of gravity, the center of gravity may be determined using simulations. For example, a known and/or estimated configuration (e.g., size, shape, weight, weight distribution) of a payload may be utilized to simulate the payload and determine a center of gravity for the payload.

In addition to determining the center of gravity of the payload and/or the combined center of gravity of the payload and the AAV, the stability of the payload may also be determined. For example, the AAV engagement location 107 may include an actuator and/or may be configured to rotate about one or more axes. After an initial measurement of the center of gravity of the payload, using the actuator and/or rotational ability, the payload may be moved, rotated, shaken, etc. Alternatively, an agent may be instructed to move, rotate, shake, etc., the payload and then reposition it at the AAV engagement location. In still another implementation, the AAV may be instructed to engage the payload, lift the payload, move, shake, rotate, etc., the payload (e.g., by altering the pitch, yaw and/or roll of the AAV) and then return the payload to the AAV engagement location 107.

After the payload has been moved, shaken, rotated, etc., the center of gravity may be measured again to determine if there has been a change to the position of the center of gravity of the payload resulting from the movement of the payload. The center of gravity of the payload may change, for example, if one or more items of the payload move inside a container as a result of the moving, shaking, rotation, etc., of the payload. For example, if items of a payload are enclosed in a container, the center of gravity of the payload may change as a result of an item moving inside the container.

In another implementation, the stability of the payload may be determined based on the flight information of the AAV. For example, the AAV may engage the payload, determine the rotational speed for each motor needed to maintain the AAV and the engaged payload in an approximately stationary and level position and then the AAV may move, rotate, shake, etc., the payload. For example, the AAV may alter the pitch, yaw and/or roll of the AAV at varying degrees thereby causing the engaged payload to move, rotate, shake, etc. In some implementations, the AAV may perform a series of defined maneuvers to simulate maneuvers that may occur during transport of the payload.

After the AAV has moved, shaken, rotated, etc., the payload, the AAV may return to loiter mode where it hovers in an approximately stationary and level position and the rotational speed at each motor may again be measured. If the rotational speed of one or more of the motors has changed, it may be determined that the center of gravity of the payload has changed.

As discussed below, if the center of gravity of the payload changes as a result of the moving, shaking, rotating, etc., of the payload, it may be determined that the payload is not stable and the payload may be rejected for transport. In some implementations, a degree of instability may be determined and, if the instability does not exceed a threshold, the payload may be approved for transport. The degree of instability may be determined, for example, based on the measured change in the position of the center of gravity and/or by performing the process of moving, shaking, rotating, etc., the payload and then measuring the center of gravity multiple times to determine an average degree of change in the center of gravity.

In addition to determining the center of gravity of the payload, the combined center of gravity of the payload and the AAV and/or the stability of the payload, similar techniques may also be utilized to determine the mass distribution of the payload, the combined mass distribution of the payload and the AAV, the moment of inertia of the payload, and/or the combined moment of inertia of the payload and the AAV. For example, the multiple sensors located at the AAV engagement location 107 may be used to measure the mass distribution of the payload when the payload is positioned at the AAV engagement location 107. Likewise, when the payload is engaged and the AAV is in flight, it may be instructed to alter its pitch, yaw and/or roll a defined amount. The force required to execute the movements may be used to determine the mass distribution and the moment of inertia.

Figure 2:
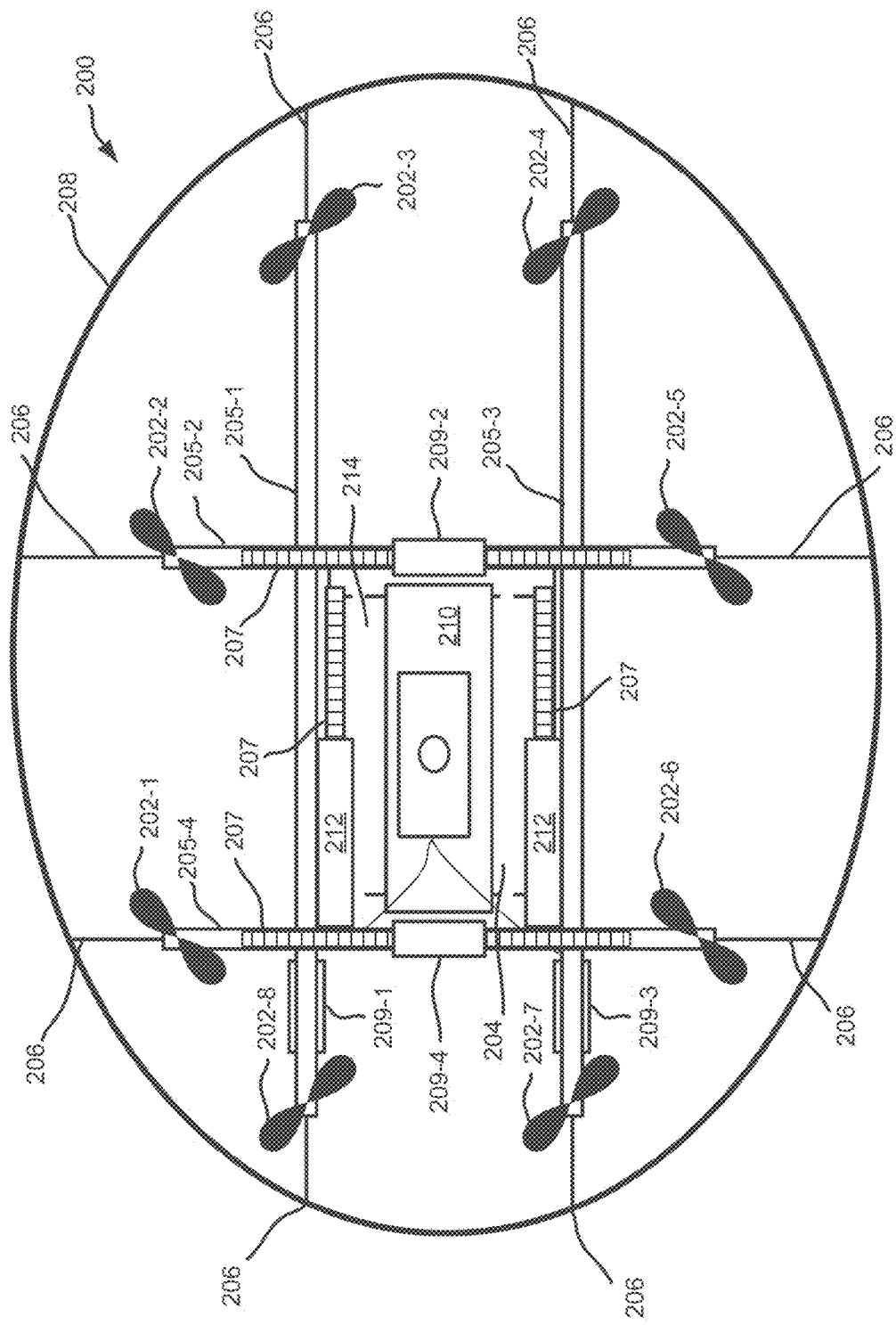
FIG. 2 is a block diagram of a top-down view of an automated aerial vehicle for transporting a payload, according to an implementation.

FIG. 2 illustrates a block diagram of a top-down view of an AAV 200, according to an implementation. As illustrated, the AAV 200 includes eight propellers 202-1, 202-2, 202-3, 202-4, 202-5, 202-6, 202-7, 202-8 spaced about the frame 204 of the AAV. The propellers 202 may be any form of propeller (e.g., graphite, carbon fiber) and of a size sufficient to lift the AAV 200 and any payload engaged by the AAV 200 so that the AAV 200 can navigate through the air, for example, to deliver a payload to a delivery location. While this example includes eight propellers, in other implementations, more or fewer propellers may be utilized. Likewise, in some implementations, the propellers may be positioned at different locations on the AAV 200. In addition, alternative methods of propulsion may be utilized. For example, fans, jets, turbojets, turbo fans, jet engines, and the like may be used to propel the AAV.

The frame 204 or body of the AAV 200 may likewise be of any suitable material, such as graphite, carbon fiber and/or aluminum. In this example, the frame 204 of the AAV 200 includes four rigid members 205-1, 205-2, 205-3, 205-4 (also referred to herein as motor arms), or beams arranged in a hash pattern with the rigid members intersecting and joined at approximately perpendicular angles. In this example, rigid members 205-1 and 205-3 are arranged parallel to one another but rigid members 205-1 and 205-3 are longer than the other rigid members of the AAV 200.

As discussed above, multiple configurations of AAVs may be utilized to carry payloads having different centers of gravity. In this example, AAV 200 may be designed to carry payloads that have an elongated shape with the center of gravity positioned toward the end with the elongated rigid members 205-1 and 205-3. Because propellers 202-3 and 202-4 are positioned farther away from the other components of the AAV 200, the center of gravity of the AAV is offset toward one side. In this configuration, flight of the AAV without any additional payload will result in the motors for propellers 202-1, 202-8, 202-7, 202-6, 202-2, 202-5 rotating at a higher speed than the motors for propellers 202-3 and 202-4. However, by engaging a payload having a center of gravity positioned more towards propellers 202-3 and 202-4, the combined center of gravity of the AAV 200 and the payload can be positioned at or near a center point between each of the propellers 202.

In some implementations, the AAV 200 may be configured with elongated members 205-1 and 205-3. In other implementations, one or more of the rigid members 205 may be adjustable. For example, one or more center of gravity adjustment mechanisms may be coupled with the rigid members and configured to extend or retract the rigid members. In some implementations, the center of gravity adjustment mechanism may engage the rigid members along a series of rails that are used to extend or retract the rigid members. In other implementations, the center of gravity adjustment mechanism may include one or more drive arms or screws that when extended or rotated cause the rigid member(s) to extend or contract. The center of gravity adjustment mechanism may be communicatively coupled to and controlled by the center of gravity adjustment controller 413, discussed below. During flight with no payload, the center of gravity adjustment mechanism may retract the rigid members 205 so that the AAV 200 is balanced with the center of gravity at or near a center-point between the propellers 202. When a payload is engaged, one or more of the rigid members, such as rigid members 205-1 and 205-3, may be elongated by the center of gravity adjustment mechanism to adjust the AAV based on the center of gravity of the payload. As discussed below, other components of the AAV may also be adjustable.

While the implementation illustrated in FIG. 2 includes four rigid members 205 that are joined to form the frame 204, in other implementations, there may be fewer or more components to the frame 204. For example, rather than four rigid members, in other implementations, the frame 204 of the AAV 200 may be configured to include six rigid members. In such an example, two of the rigid members 205-2, 205-4 may be positioned parallel to one another. Rigid members 205-1, 205-3 and two additional rigid members on either side of rigid members 205-1, 205-3 may all be positioned parallel to one another and perpendicular to rigid members 205-2, 205-4. With additional rigid members, additional cavities with rigid members on all four sides may be formed by the frame 204. As discussed further below, a cavity within the frame 204 may be configured to include a payload engagement element 214 for the engagement, transport and delivery of payloads.

In some implementations, the AAV may be configured for aerodynamics. For example, an aerodynamic housing may be included on the AAV that encloses the AAV control system 210, one or more of the rigid members 205, the frame 204 and/or other components of the AAV 200. The housing may be made of any suitable material(s) such as graphite, carbon fiber, aluminum, etc. Likewise, in some implementations, the location and/or the shape of the payload engagement element 214 and/or any payload may be aerodynamically designed. For example, specially shaped containers for use with the AAV 200 may be aerodynamically designed and used at operating locations 103 (FIG. 1) for packing items for transport.

In some implementations, the payload engagement element 214 may be configured such that, when a payload is engaged, the payload is enclosed within the frame and/or housing of the AAV 200 so that no additional drag is created during transport of the item. In other implementations, the payload may be shaped to reduce drag and provide a more aerodynamic design. For example, if a portion of a payload extends below the AAV when engaged, the exposed portion of the payload may have a curved shape.

The propellers 202 and corresponding propeller motors (not shown) are positioned at the ends of each rigid member 205. The propeller motors may be any form of motor capable of generating enough rotational speed with the propellers to lift the AAV 200 and any engaged payload, thereby enabling aerial transport of the item. For example, the propeller motors may each be a FX-4006-13 740 kv multi-rotor motor.

Extending outward from each rigid member is a support arm 206 that is connected to a safety barrier 208. In this example, the safety barrier is positioned around and attached to the AAV 200 in such a manner that the motors and propellers 202 are within the perimeter of the safety barrier 208. The safety barrier may be plastic, rubber, etc. Likewise, depending on the length of the support arms 206 and/or the length, number or positioning of the rigid members 205, the safety barrier may be round, oval, or any other shape. In some implementations, the safety barrier 208 may be elastic or extendable so that it will adjust as the rigid members 205 are retracted and/or extended.

Mounted to the frame 204 is the AAV control system 210. In this example, the AAV control system 210 is mounted on top of the frame 204. The AAV control system 210, as discussed in further detail below with respect to FIG. 4, controls the operation, routing, navigation, communication, payload engagement, payload adjustment, and adjustment of AAV components.

The AAV 200 also includes one or more power modules 212. In this example, the AAV 200 includes two power modules 212 that are removably mounted to the frame 204 and horizontally adjustable along tracks or rails 207. The power module for the AAV may be in the form of battery power, solar power, gas power, super capacitor, fuel cell, alternative power generation source, or a combination thereof. For example, the power modules 212 may each be a 6000 mAh lithium-ion polymer battery, polymer lithium ion (Li-poly, Li-Pol, LiPo, LIP, PLI or Lip) battery. The power module(s) 212 are coupled to and provide power for the AAV control system 210 and the propeller motors. In some implementations, one or more of the power modules may be configured such that it can be autonomously removed and/or replaced with another power module while the AAV lands. In some implementations, when the AAV lands at a designated location, the AAV may engage with a charging member at the location that will recharge the power module.

Similar to the adjustable rigid members 205, the power module(s) may be horizontally adjusted by a center of gravity adjustment mechanism to alter the center of gravity of the AAV 200. For example, the center of gravity adjustment mechanism may include a series of rails 207, gears and/or motors that are configured to move the power modules 212 along the rails 207. In this example, the power modules 212 are positioned to one side of the frame 204 thereby moving the center of gravity of the AAV toward that side of the AAV.

In addition to horizontally adjustable power modules 212 and retractable rigid members 205, other components of the AAV 200 may also be adjusted to move the center of gravity of the AAV. For example, the AAV 200 may also include one or more counterweights 209 that are adjustable to further move the center of gravity of the AAV 200. In the example illustrated in FIG. 2, the counterweights 209 are adjustable by a center of gravity adjustment mechanism along the length of the rigid members 205. For example, counterweights 209-1 and 209-3 may be positioned on the lower or bottom side of the AAV 200 and adjusted along the length of the rigid members 205-1 and 205-3 respectively. Likewise, the counterweights 209-2 and 209-4 are positioned on the upper or top side of rigid members 205-2 and 205-4, respectively, and may be positioned along the length of rigid members 205-2 and 205-4.

While the example illustrated in FIG. 2 shows the counterweights 209 attached to and adjustable along the outside of the rigid members 205, in other implementations, the counterweights 209 may be located on other and/or additional locations of the AAV 200. In other implementations, the counterweights may be located and adjustable by a center of gravity adjustment mechanism along the inside of the rigid members 205. In addition, counterweights may be added and/or removed by agents, as appropriate.

Likewise, while the horizontally adjustable power modules 212 are shown as adjustable across the frame 204, in other implementations and AAV configurations, the power modules may be adjustable along other portions of the AAV 200. In addition, other components of the AAV 200 may also be adjustable.

Providing adjustable components of the AAV 200 allows the center of gravity of the AAV 200 to be adjusted and/or repositioned so that the combined center of gravity of the AAV 200 and an engaged payload is at or near a defined position with respect to the propellers of the AAV 200.

The AAV 200 may also include a payload engagement element 214. The payload engagement element may be configured to engage and disengage payloads. For example, the payload engagement element 214 may include a plurality of engaging latches (not shown) configured to engage one or more engagement locations of the payload, as discussed below with respect to FIG. 3. In this example, the payload engagement element 214 is positioned within a cavity of the frame 204 that is formed by the intersections of the rigid members 205. The payload engagement element may be positioned beneath the AAV control system 210. Likewise, the payload engagement element may be horizontally adjustable to move the engaged payload with respect to the AAV 200.

Figure 6:
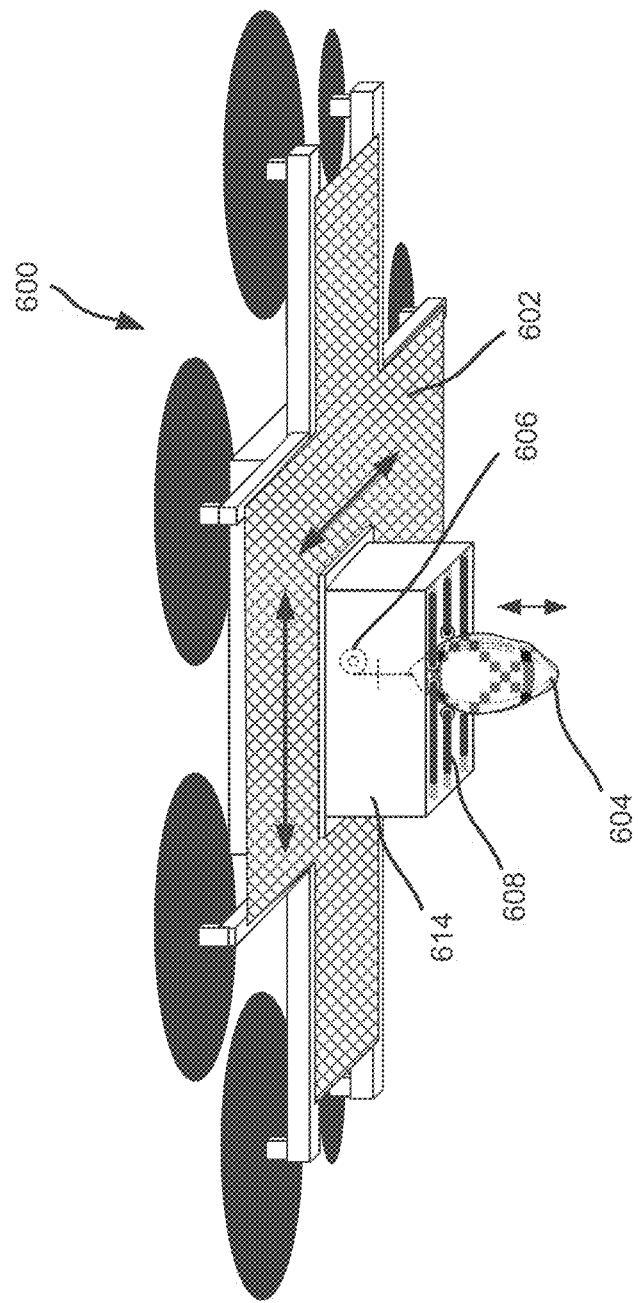
FIG. 6 depicts another side view of an automated aerial vehicle, according to an implementation.

In implementations with additional rigid members, the AAV may include additional payload engagement elements and/or the payload engagement element 214 may be positioned in a different cavity within the frame 204. The payload engagement element may be of any size sufficient to securely engage and disengage a payload (e.g., items and/or containers that contain items). In other implementations, the payload engagement element 214 may operate as the container, containing the item(s) to be delivered. In still other implementations, as illustrated in FIG. 6, the payload engagement element may include a vertically retractable element (e.g., cable) that can be extended and used to engage a payload that is then retracted into the payload engagement element 214 of the AAV 200. The payload engagement element 214 communicates with (via wired or wireless communication) and is controlled by the AAV control system 210.

While the implementations of the AAV 200 discussed herein utilize propellers to achieve and maintain flight, in other implementations, the AAV may be configured in other manners. For example, the AAV may include fixed wings and/or a combination of both propellers and fixed wings. For example, the AAV may utilize one or more propellers to enable takeoff and landing and a fixed wing configuration or a combination wing-and-propeller configuration to sustain flight while the AAV is airborne.

As will be described in more detail below with respect to FIG. 4, the AAV control system 210 may operate in conjunction with or may otherwise utilize or communicate (e.g., via wired and/or wireless communication) with one or more components of the materials handling facility management system 150. Likewise, components of the materials handling facility management system 150 may generally interact and communicate with the AAV control system 210 and/or communicate with other components of the storage area 100.

Figure 3:
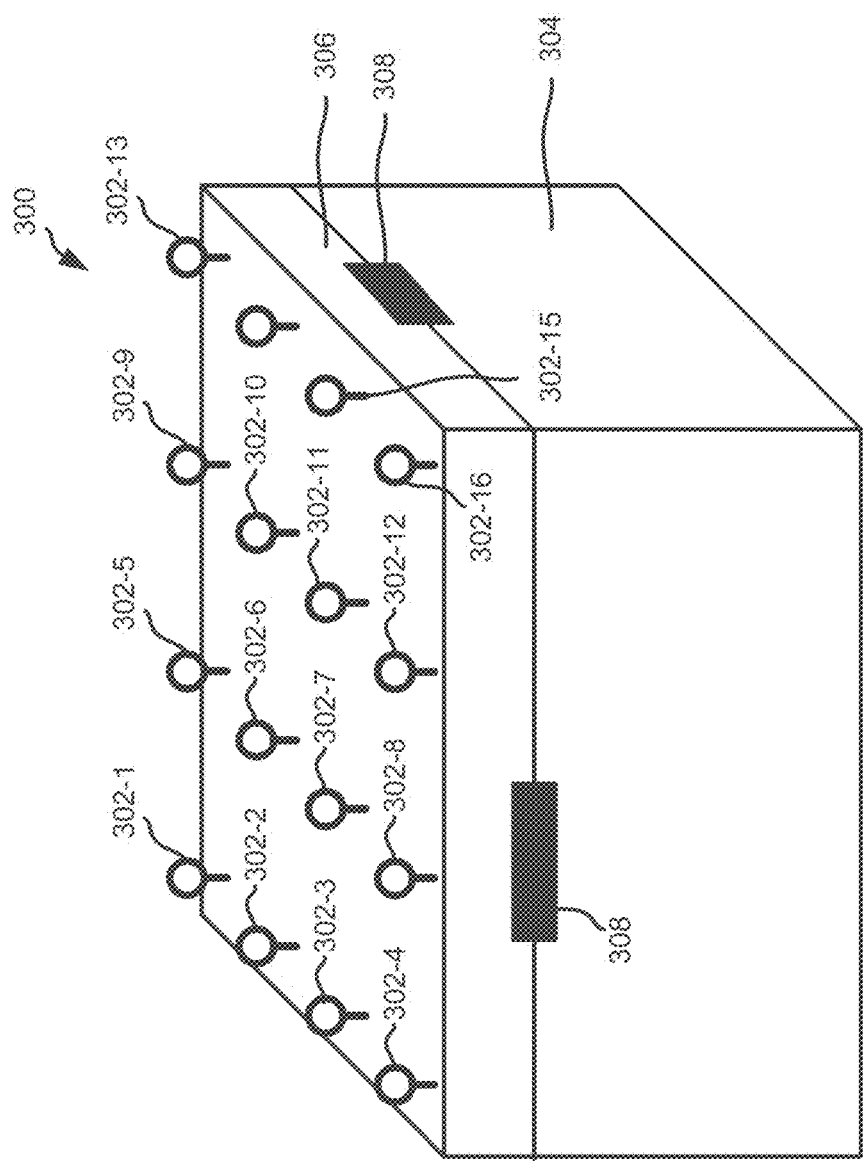
FIG. 3 is a block diagram of a payload, according to an implementation.

FIG. 3 is a block diagram of an example payload that may be engaged by an AAV 200. In this example, the payload 300 is a container into which one or more items (not shown) may be placed for transport. The payload 300 may include multiple engagement locations 302 to facilitate engagement of the payload 300 by an AAV 200.

As discussed above, different AAV configurations may be used and/or AAVs may engage the payload at different locations based on the determined center of gravity of the payload. For example, a smaller AAV may have a smaller payload engagement element having a size that is capable of engaging with one or any number of adjacent engagement locations 302. For example, a small AAV, such as AAV 200A (FIG. 1) may be able to engage the payload 300 using engagement locations 302-1, 302-2, 302-5 and 302-6.

Engaging with engagement locations 302-1, 302-2, 302-5 and 302-6 in the upper corner of the payload 300 may be done if it is determined that the majority of the weight of the payload, and thus the center of gravity of the payload, is positioned near that portion of the payload 300. If the center of gravity of the payload is centered with respect to the payload, a small AAV, such as AAV 200A, may engage the payload at engagement locations 302-6, 302-7, 302-10, and 302-11. Any other group of adjacent engagement locations or any other number of engagement locations may also be utilized, depending on the determined center of gravity of the payload and/or the configuration of the AAV 200.

Other AAV configurations may engage other engagement locations of the payload 300. For example, AAV 200B (FIG. 1) may be configured such that the payload engagement element of AAV 200B can attach with two adjacent engagement locations and another set of adjacent engagement locations that are not adjacent to the first two. For example, AAV 200B may be able to engage with engagement locations 302-3, 302-4, 302-11 and 302-12. Engagement locations 302-3 and 302-4 are adjacent to each other, and engagement locations 302-11 and 302-12 are adjacent to each other, but there is another set of engagement locations 302-7 and 302-8 between the engagement locations 302-3, 302-4 and engagement locations 302-11, 302-12. In another example engagement, the AAV 200B may rotate and engage with engagement locations 302-9, 302-13, 302-11 and 302-15. As another example, a large AAV, such as AAV 200C (FIG. 1), may be configured to attach to non-adjacent engagement locations. For example, AAV 200C may be able to engage the payload at engagement locations 302-1, 302-4, 302-13 and 302-16.

In still other implementations, the payload engagement elements of one or more of the AAVs may be adjustable to enable the AAV to engage at different spacings of engagement locations. For example, AAV 200C may include an adjustable width engagement element such that it can attach to engagement locations 302-1, 302-4, 302-13 and 302-16 when expanded and attach to any set of adjacent engagement locations, such as 302-6, 302-7, 302-10, 302-11 when contracted, and/or any other configuration.

In another implementation, the payload 300 may be configured to receive an engagement location 302 at one of multiple positions on the payload 300. For example, the payload 300 may include one or more receiving members (e.g., holes, grooves, openings) that can be utilized to selectively attach an engagement location 302. For example, an agent may be instructed to place or attach an engagement location 302 into a particular receiving member of the payload 300 based on the determined center of gravity of the payload 300 and/or based on the AAV configuration selected to transport the payload. In another implementation, the receiving members of the payload may operate as the engagement locations. In such an implementation, the AAV may have an engagement element that is configured to position or insert into the receiving members of the payload.

While the above example describes three different AAV configurations for engaging payloads, any size and/or shape of AAV may be utilized with the implementations described herein. Likewise, any configuration of engagement elements and/or engagement locations 302 may be utilized with the implementations discussed herein.

The payload 300 may include a base 304 that is separable from a top 306 to allow placement of items into the payload 300. In some implementations, the base and the top may be connected using latches 308 or other connection mechanisms. Likewise, in some implementations, the top 306, which includes the engagement locations, may be replaceable with other same sized tops that have different configurations of engagement locations. For example, rather than having a top 306 with sixteen engagement locations, as illustrated in FIG. 3, the top 306 may be replaced with another top having additional or fewer engagement locations and/or engagement locations positioned differently than those illustrated in FIG. 3.

Figure 4:
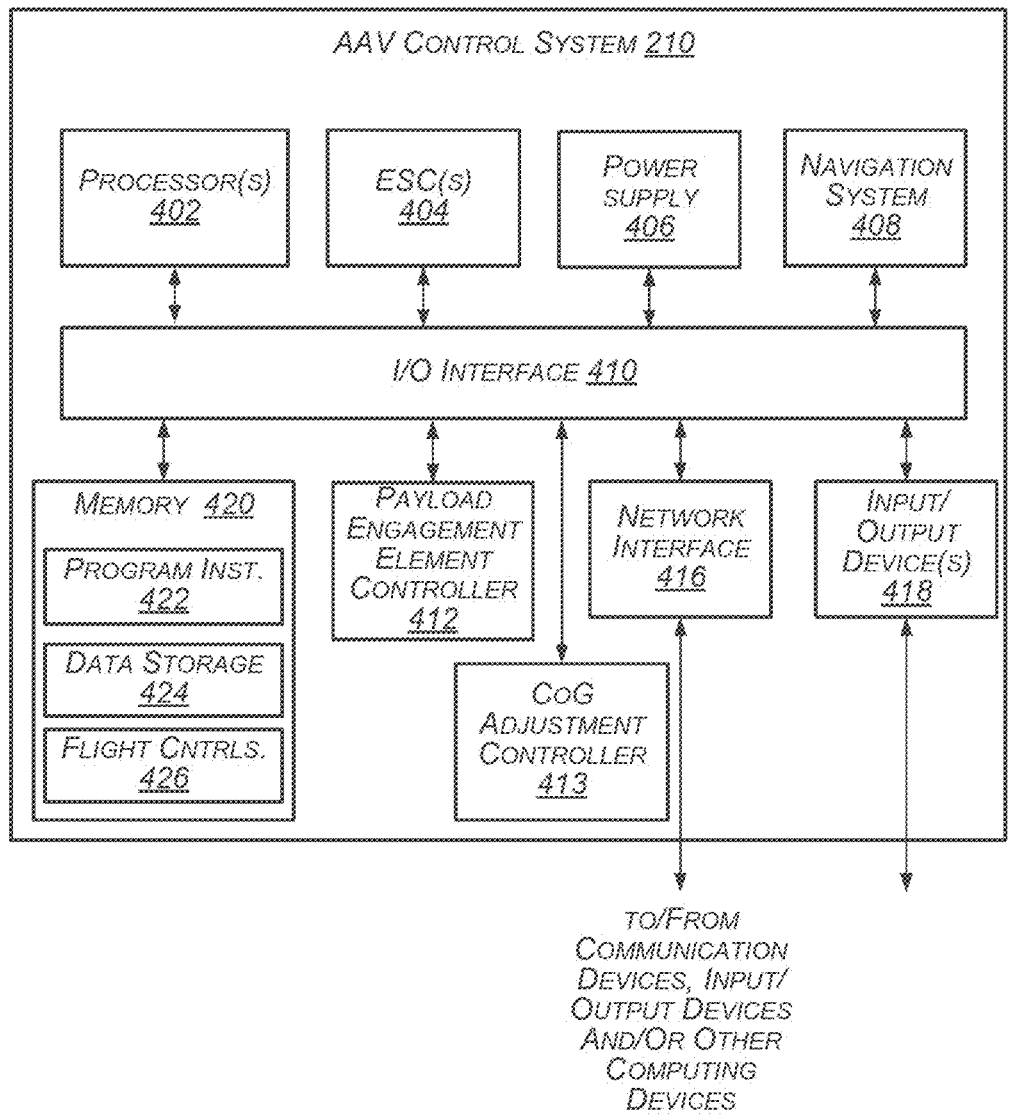
FIG. 4 is a block diagram illustrating various components of an automated aerial vehicle control system, according to an implementation.

FIG. 4 is a block diagram illustrating an example AAV control system 210 of the AAV 200. In various examples, the block diagram may be illustrative of one or more aspects of the AAV control system 210 that may be used to implement the various systems and methods discussed herein. In the illustrated implementation, the AAV control system 210 includes one or more processors 402, coupled to a memory, e.g., a non-transitory computer readable storage medium 420, via an input/output (I/O) interface 410. The AAV control system 210 may also include electronic speed controls 404 (ESCs), power supply modules 406 and/or a navigation system 408. The AAV control system 210 further includes a payload engagement element controller 412, a center of gravity adjustment controller 413, a network interface 416, and one or more input/output devices 418.

In various implementations, the AAV control system 210 may be a uniprocessor system including one processor 402, or a multiprocessor system including several processors 402 (e.g., two, four, eight, or another suitable number). The processor(s) 402 may be any suitable processor capable of executing instructions. For example, in various implementations, the processor(s) 402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 402 may commonly, but not necessarily, implement the same ISA.

The non-transitory computer readable storage medium 420 may be configured to store executable instructions, data, flight paths, flight control parameters, component adjustment information, center of gravity information, and/or data items accessible by the processor(s) 402. In various implementations, the non-transitory computer readable storage medium 420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 420 as program instructions 422, data storage 424 and flight controls 426, respectively. In other implementations, program instructions, data and/or flight controls may be received, sent or stored upon different types of computer-accessible media, such as non-transitory media, or on similar media separate from the non-transitory computer readable storage medium 420 or the AAV control system 210. Generally speaking, a non-transitory, computer readable storage medium may include storage media or memory media such as magnetic or optical media, e.g., disk or CD/DVD-ROM, coupled to the AAV control system 210 via the I/O interface 410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 416.

In one implementation, the I/O interface 410 may be configured to coordinate I/O traffic between the processor(s) 402, the non-transitory computer readable storage medium 420, and any peripheral devices, the network interface or other peripheral interfaces, such as input/output devices 418. In some implementations, the I/O interface 410 may perform any necessary protocol, timing or other data transformations to convert data signals from one component (e.g., non-transitory computer readable storage medium 420) into a format suitable for use by another component (e.g., processor(s) 402). In some implementations, the I/O interface 410 may include support for devices attached through various types of peripheral buses, such as a variant of the Peripheral Component Interconnect (PCI) bus standard or the Universal Serial Bus (USB) standard, for example. In some implementations, the function of the I/O interface 410 may be split into two or more separate components, such as a north bridge and a south bridge, for example. Also, in some implementations, some or all of the functionality of the I/O interface 410, such as an interface to the non-transitory computer readable storage medium 420, may be incorporated directly into the processor(s) 402.

The ESCs 404 communicate with the navigation system 408 and adjust the rotational speed of each propeller motor to stabilize the AAV and guide the AAV along a determined flight path. Likewise, the ESCs 404 may communicate with the center of gravity adjustment controller 413, providing rotational speed information for each motor. The center of gravity adjustment controller 413 may utilize the received rotational speed information to determine the center of gravity of the payload, the center of gravity of the AAV and/or the combined center of gravity of the AAV and the payload. Likewise, the center of gravity adjustment controller 413 may utilize the received rotational speed information to adjust one or more components of the AAV, adjust the position of the payload by moving the payload engagement element and/or by adjusting the engagement location between the AAV and the payload. For example, the center of gravity adjustment controller 413 may instruct the center of gravity adjustment mechanism to adjust the position of one or more components (e.g., power module(s), counterweight(s), rigid member(s)) of the AAV. In some implementations, the center of gravity adjustment controller may continually receive rotational speed information from the ESCs 404 and make adjustments to the positions of various AAV components so that the combined center of gravity of the AAV and the payload is within a defined position, such as a center position between each of the propellers. When the AAV is loitering with a payload and there are no (or minimal) external forces, such as wind, when the center of gravity is positioned at or near a center point between the propellers of the AAV, the rotational speed of each of the motors will be approximately equal.

In addition to determining the center of gravity based on received rotational speed information, the center of gravity adjustment controller may also utilize received rotational speed information to determine the mass distribution of the payload, the mass distribution of the AAV and/or the combined mass distribution of the payload and the AAV. For example, the center of gravity adjustment controller 413 may communicate with the ESCs and cause the ESCs to alter the pitch, yaw and/or roll of the AAV a defined amount. Based on the rotational power required to move the AAV the desired amount, the inertial moment of the AAV may be determined, along with the mass distribution.

In some implementations, the center of gravity adjustment controller 413 may also operate as a payload stability controller to determine the stability of an engaged payload. For example, instructions may be sent to the ESCs 404 to alter the rotational speed of the motors to cause the AAV to adjust its pitch, yaw and/or roll, thereby moving, shaking and/or rotating the engaged payload. After the payload has been moved, shaken, rotated, etc., the AAV may return to loiter and the ESCs may provide rotational speed information for the motors that is used to keep the AAV approximately stationary and level. If the rotational speed has changed, it may be determined that the payload is unstable because the position of the center of gravity of the payload has changed.

Multiple techniques may be utilized to determine the center of gravity, stability of the payload, moment of inertia, mass distribution, etc. For example, rather than or in addition to determining the center of gravity as discussed above, one or more simulations may be performed to determine the center of gravity, stability, mass distribution and/or moment of inertia for the AAV and payload.

The navigation system 408 may include a global positioning system (GPS), indoor positioning system (IPS), or other similar system and/or sensors that can be used to navigate the AAV 200 to and/or from a location. The payload engagement element controller 412 communicates with the actuator(s) or motor(s) (e.g., a servo motor) used to engage and/or disengage items. For example, when the AAV is positioned over the AAV engagement location 107 (FIG. 1), the payload engagement element controller 412 may provide an instruction to a motor that controls the payload engagement element to engage the payload located at the AAV engagement location 107.

The network interface 416 may be configured to allow data to be exchanged between the AAV control system 210, other devices attached to a network, such as other computer systems (e.g., remote computing resources 110), and/or with AAV control systems of other AAVs. For example, the network interface 416 may enable wireless communication between the AAV 200 and the materials handling facility management system 150 that is implemented on one or more of the remote computing resources 110. For wireless communication, an antenna of an AAV or other communication components may be utilized. As another example, the network interface 416 may enable wireless communication between numerous AAVs. In various implementations, the network interface 416 may support communication via wireless general data networks, such as a Wi-Fi network. For example, the network interface 416 may support communication via telecommunications networks, such as cellular communication networks, satellite networks, and the like.

Input/output devices 418 may, in some implementations, include one or more displays, imaging devices, thermal sensors, infrared sensors, time of flight sensors, accelerometers, pressure sensors, weather sensors, etc. Multiple input/output devices 418 may be present and controlled by the AAV control system 210. One or more of these sensors may be utilized to assist in the landing as well as avoid obstacles during flight.

As shown in FIG. 4, the memory may include program instructions 422, which may be configured to implement the example routines and/or sub-routines described herein. The data storage 424 may include various data stores for maintaining data items that may be provided for determining flight paths, flight control parameters, retrieving items, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 210 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 210 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 210. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the AAV control system 210 may be transmitted to the AAV control system 210 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

While the functional components of the example AAV 200 are discussed herein as part of the AAV 200, in other implementations, one or more of the functional components may be distributed throughout the materials handling facility and/or implemented as part of the materials handling facility management system 150. For example, one or more of the aspects of the program instructions 422 and/or the center of gravity adjustment controller 413 may be implemented as part of the materials handling facility management system 150.

Figure 5:
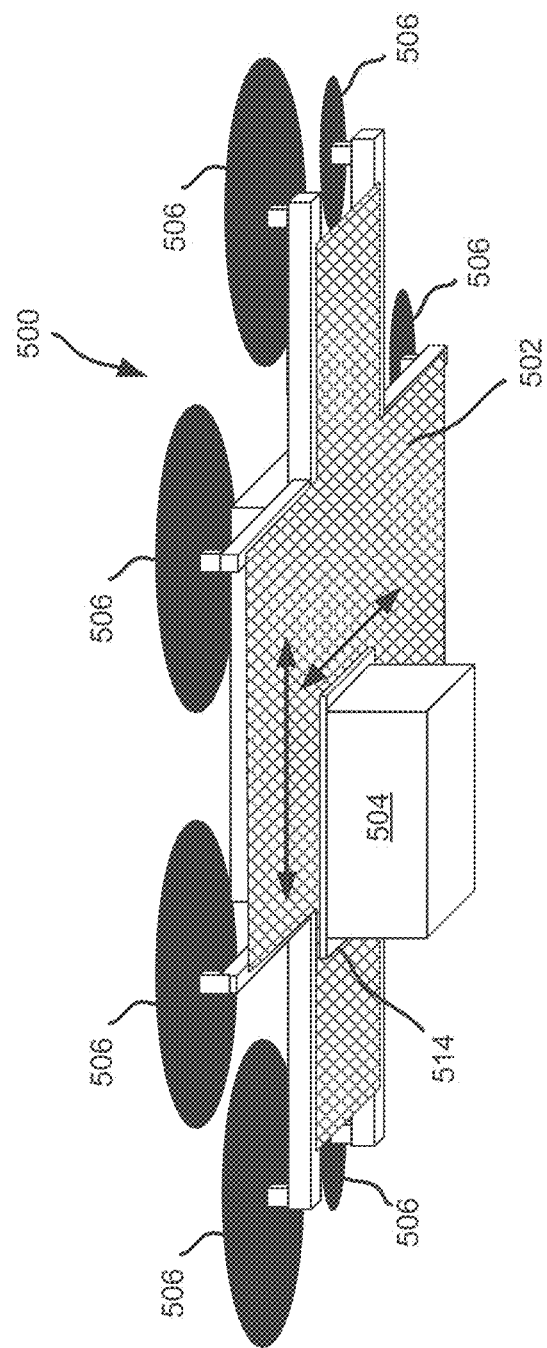
FIG. 5 depicts a side view of an automated aerial vehicle, according to an implementation.

FIG. 5 is a block diagram of a side view of an AAV 500 with a horizontally adjustable payload engagement element 514, according to an implementation. As discussed above, the center of gravity of the AAV may be adjusted by moving components of the AAV. Alternatively, the center of gravity of the payload may be adjusted by altering the point(s) of engagement between the AAV and the payload (FIG. 3) and/or altering the position of the payload engagement element 514 with respect to the AAV 500. The payload engagement element 514 is another component of the AAV 500 that may be horizontally positioned by the center of gravity adjustment controller 413.

In one implementation, the payload engagement element 514 may engage a payload 504 using a variety of techniques. For example, as discussed above with respect to FIG. 3, the payload engagement element 514 may be configured to engage one or more engagement locations positioned on the top of the payload 504. In other implementations, the payload engagement element 514 may include one or more rotatable arms and/or engaging latches that may be positioned to engage the payload.

Regardless of the technique used for engaging the payload, the payload engagement element 514 may be adjusted horizontally with respect to the AAV 500 using the grid 502. For example, the payload engagement element 514 may be secured to the grid 502 through a series of rollers, gears, wheels, etc., and may be movable in any direction along the grid 502. If it is determined that the center of gravity of a payload is offset to one side of the payload 504, such as the right side of the payload illustrated in FIG. 5, the payload engagement element may be adjusted along the grid 502 so that the position of the center of gravity of the payload when engaged with the payload engagement element 514 is at a desired position with respect to the AAV 500. In this example, the payload engagement element 514 has been positioned so that the center of gravity of the payload is approximately at a center point between the propellers 506 of the AAV 500.

FIG. 6 is another side view of an AAV 600 with a payload engagement element 614, according to an implementation. Similar to the payload engagement element 514 of FIG. 5, payload engagement element 614 may be adjusted horizontally with respect to the AAV 600 along the grid 602. In the implementation illustrated in FIG. 6, the payload engagement element 614 may also be capable of vertically adjusting and/or engaging the payload 604 and securing the payload 604 in the payload engagement element 614. For example, a pulley 606 or other retractable system may be included in the cavity of the payload engagement element 614. When a payload is to be engaged, the pulley 606 may extend an engagement member (e.g., cable) that can be attached to the payload. In this example, rather than the payload including a rigid container that holds one or more items, the items may be placed in a bag or other flexible container that is secured to the engagement member. Once secured, the pulley 606 may retract the engagement member thereby moving the payload vertically into the cavity of the payload engagement element 614.

Using flexible containers for containing the payload, the items of the payload will position themselves within the flexible container based on the size and shape of the items. In addition, as the payload is retracted into the cavity of the payload engagement element, it may be stabilized by one or more stabilizing elements 608. The stabilizing elements 608 may be pressure or spring loaded elements that form around the payload as it is retracted into the cavity of the payload engagement element 614, thereby securing and stabilizing the payload in the cavity of the payload engagement element 614.

Utilizing a pulley 606 that can extend and retract an engagement member enables the AAV to engage and/or disengage payload from an increased distance that keeps the AAV away from the location of the payload when it is engaged or disengaged. For example, if the delivery location of the payload is an insecure area (e.g., a customer's backyard) the AAV may position itself over the delivery location and, instead of landing and potentially contacting one or more objects with a propeller, it may lower the payload to the delivery location and disengage the payload without the AAV having to navigate down to the delivery location. Likewise, payloads may be engaged without the AAV navigating down to the location of the payload.

Figure 7:
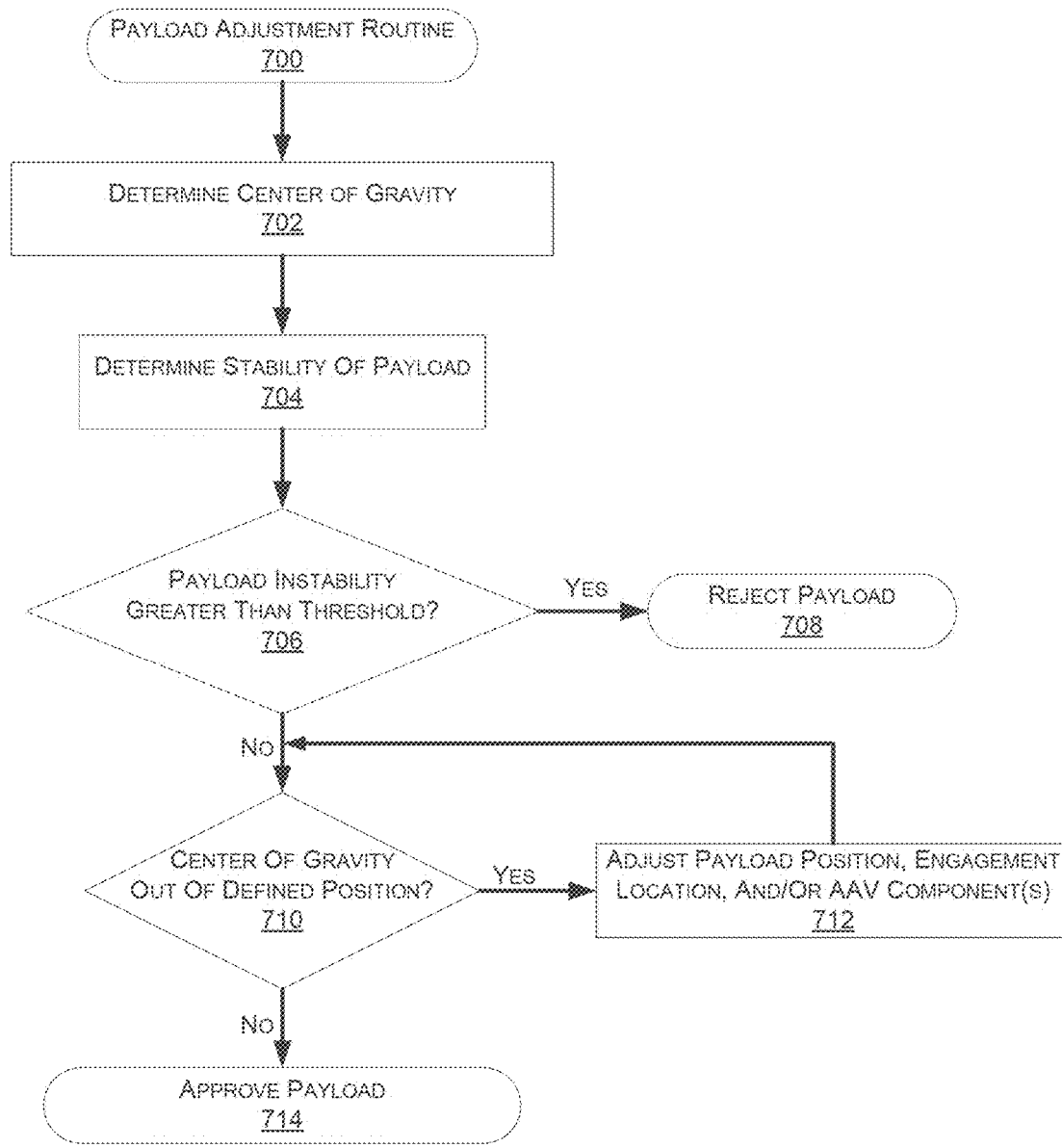
FIG. 7 is a flow diagram of an automated aerial vehicle adjustment routine, according to an implementation.

FIG. 7 is a flow diagram of an example payload adjustment routine 700, according to an implementation. The routine of FIG. 7 and each of the other routines discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example payload adjustment routine 700 begins by determining the center of gravity of the payload, as in 702. As discussed above, the center of gravity of the payload may be determined by the materials handling facility management system 150, by the AAV 200 and/or through simulation. For example, sensors may be positioned at the AAV engagement location 107 (FIG. 1) and when the payload is placed at the AAV engagement location 107, the forces and/or mass detected by each sensor may be utilized to determine the center of gravity of the payload. Alternatively, or in addition thereto, the AAV may engage the payload, lift the payload from the AAV engagement location and loiter with the payload. The ESCs for each motor may provide rotational speed information needed to keep the AAV at an approximately stationary and level position. The rotational speed of each motor may be utilized to determine the center of gravity of the payload. In yet another example, the AAV may engage the payload and lift the payload with the rotational speed of each motor being equal, or at a defined rotational speed needed to keep the AAV in an approximately stationary and level position when there is no engaged payload. As the AAV lifts the payload, one or more cameras located within the facility and/or inertial sensors located on the AAV may detect a change in the pitch and/or roll of the AAV and, based on the change in the pitch and/or roll, the center of gravity of the payload may be determined.

In some implementations, a combination of two or more of these techniques may be utilized together to determine the center of gravity of the payload. In other implementations, only one technique may be utilized. In still other implementations, one or more of the described techniques may be utilized to determine the combined center of gravity of the payload and the AAV. For example, the AAV may engage with the payload at the AAV engagement location 107 and shut off its motors and come to rest on the payload. The sensors located within the AAV engagement location and the forces and/or mass measured at each sensor may be utilized to determine the combined center of gravity of the payload and the AAV. Likewise, the rotational speed from the ESCs and/or the change in the pitch and/or roll of the AAV when the payload is engaged and lifted can be used to determine the combined center of gravity of both the AAV and the engaged payload. In another example, the center of gravity of the AAV and the center of gravity of the payload may be known or determined and the combined center of gravity may be simulated.

In addition to determining the center of gravity of the payload and/or the combined center of gravity of the AAV and the payload, the stability of the payload may be determined, as in 704. As discussed above, the stability may be determined at the AAV engagement location and/or by the AAV. For example, the AAV engagement location may be configured to rotate, shake, move, etc., the payload. Alternatively, or in addition thereto, an agent may rotate, shake, move, etc., the payload and return the payload to the AAV engagement location. In another example, the AAV may engage the payload, lift, rotate, shake, move, etc., the payload and then return the payload to the AAV engagement location.

After the payload is rotated, shaken, moved, etc., the center of gravity may again be determined based on the forces measured at the sensors of the AAV engagement location. If the center of gravity has changed, it may be determined that the payload is not stable. A payload may be unstable if, for example, one or more items included in a container of the payload are able to move within the container of the payload.

As another example, the stability of the payload may be determined by the AAV. For example, after the center of gravity has been determined for the payload, the AAV may shake, rotate, move, etc., the payload by adjusting the pitch, yaw, and/or roll of the AAV. After shaking, rotating, moving, etc., the payload, the AAV may return to a loiter position and the ESCs may provide the rotational speed needed to keep the AAV approximately stationary and level. The rotational speeds may be used to recompute the center of gravity. If the center of gravity has changed, it may be determined that the payload is unstable.

In some implementations, the process for determining the stability of the payload may be performed multiple times and an average change in the center of gravity and/or a maximum change in the center of gravity may be determined for the payload.

A determination may also be made as to whether the payload instability is greater than a threshold, as in 706. The threshold may be any defined amount. Likewise, the threshold may be different for different AAV configurations, for different payload configurations, based on expected weather conditions, etc. For example, a larger AAV may be able to withstand larger shifts in the center of gravity of the payload than a smaller AAV and, thus, a larger AAV may have a higher threshold than a smaller AAV. In some implementations, the threshold may be zero in that any measured change in the center of gravity of the payload may result in a determination that the payload instability exceeds the threshold.

If it is determined that the payload instability exceeds the threshold, the payload may be rejected for transport, as in 708. For example, the AAV may disengage the payload and an agent may receive instructions to repack and/or reposition items of the payload. In some instances, the agent may be able to add additional dunnage to the container of the payload thereby reducing or eliminating the ability for the items in the container to move.

If it is determined that the payload instability does not exceed the threshold, a determination is made as to whether the measured center of gravity of the payload is outside of a defined position (two or three dimensional) with respect to the AAV, as in 710. In one implementation, the defined position may be a three dimensional space around a center point between each of the motors or propellers of the AAV. For example, if the AAV is one meter wide by one meter long, the position may be a 0.25 meter diameter sphere around the center point between the motors or propellers of the AAV. In other implementations, the defined position may be at other positions with respect to the AAV.

If the center of gravity of the payload (or the combined center of gravity of the payload and the AAV) is outside of the defined position, one or more adjustments may be made to reposition the center of gravity of the payload and/or the AAV, as in 712. For example, the payload engagement element and the engaged payload may be adjusted with respect to the AAV. Alternatively, or in addition thereto, one or more other components of the AAV (e.g., power module(s), motor arms, counterweights) may be adjusted to reposition the center of gravity. In another implementation, the payload may be disengaged and then re-engaged at different engagement locations.

As adjustments are made, the process of determining the center of gravity may be continually monitored and adjustments may continue until the center of gravity is within the defined position. For example, if the center of gravity is determined based on the rotational speed of the motors, the center of gravity adjustment controller 413 may cause one or more components of the AAV to be adjusted. As the components are adjusted, the ESCs may continue to provide the rotational speeds of each motor to the center of gravity adjustment controller 413. The center of gravity adjustment controller 413 may continue making adjustments to the position of various components of the AAV until the center of gravity determined based on the rotational speed of the motors is within the defined position.

In other implementations, an agent may add or remove counterweights to different locations of the AAV to adjust the center of gravity. If all adjustments are made to the extent possible, or up to a defined adjustment boundary, and the center of gravity is not within the defined position, the payload may be rejected. However, if it is determined at decision block 710 that the center of gravity is within the defined position, the payload is approved for transport, as in 714.

In some implementations, the flight controls of the AAV may be adjusted based on the adjustments made to the AAV components and/or based on the engaged payload. For example, in addition to determining and adjusting the center of gravity, the mass distribution of the payload and/or a combined mass distribution of the AAV and the engaged payload may be determined. For example, as part of the routine 700, the AAV may be instructed to adjust the pitch, yaw and/or roll a defined amount. As the adjustment is made, the ESCs may provide the rotational speeds of each motor, and the force needed to make the adjustments may be determined and used to compute the mass distribution of the payload, the combined mass distribution of the AAV and the payload and/or the moments of inertia for the AAV and/or the payload. Based on the determined mass distribution, moment of inertia, and/or the center of gravity, one or more flight control parameters may be adjusted. For example, if the payload has a large mass distribution, the flight control parameters may be adjusted to reduce the amount of pitch, roll and yaw that may be executed at any given time.

Figure 8:
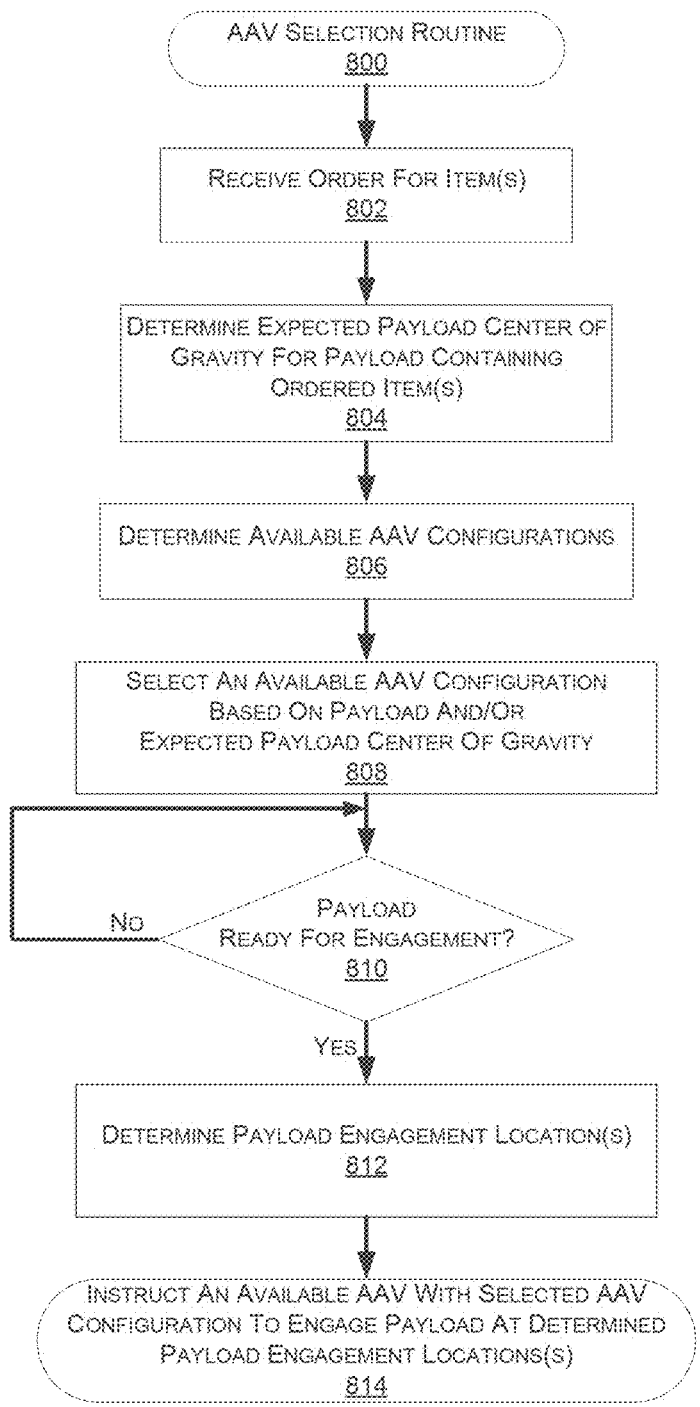
FIG. 8 is a flow diagram of an automated aerial vehicle selection routine, according to an implementation.

FIG. 8 is a flow diagram of an AAV selection routine 800, according to an implementation. The example routine 800 begins upon receipt of an order for one or more items, as in 802. As discussed above, users may order items from an e-commerce website or other entity for delivery to a user specified destination using an AAV.

Upon receiving the order, an expected payload center of gravity is determined for the payload that will contain the ordered items, 804. The expected payload center of gravity may be estimated based on stored item information for each of the ordered items and/or based on the anticipated packing configuration of the items into a container. For example, the materials handling facility management system 150 may maintain item information, such as item dimensions, weight, mass distribution, center of gravity, etc. Item information may be provided by the manufacturer or seller of the item, determined as the item is received into the materials handling facility and/or determined based on measurements of the items as they are processed and/or shipped from the materials handling facility.

In some implementations, the materials handling facility management system 150 may determine an appropriate container for packing the ordered items and forming a payload. Likewise, the materials handling facility management system 150 may determine a packing configuration specifying how the items are to be packed into the container. Based on the packing configuration and stored item information, an expected center of gravity is determined for the payload.

In addition to determining the expected center of gravity and the container into which the items are to be packed to form a payload, the available AAV configurations that may be utilized to transport the payload are determined, as in 806. For example, while there may be multiple different AAV configurations associated with a materials handling facility, not all of the AAV configurations may be available at the appropriate time to transport the payload and/or some of the AAV configurations may not be capable of transporting the payload.

In some implementations, the routine 800 may consider the total weight of the payload, the size of the payload and/or the distance the AAV must travel to deliver the payload. As discussed above, not all AAV configurations may be capable of carrying heavy and/or large payloads. Likewise, based on the distance to be traveled to deliver the payload, not all AAV configurations may have power modules sufficient to travel the needed distance.

Based on the determined available AAV configurations and the payload characteristics (e.g., weight, size, center of gravity), an available AAV configuration is selected, as in 808. For example, if there are two AAV configurations that are capable of transporting the payload, it may be determined, based at least in part on the expected center of gravity of the payload, which AAV configuration can be adjusted to most efficiently transport the payload.

Upon selection of an available AAV configuration, a determination is made as to whether the payload is ready for engagement, as in 810. As discussed above, a payload may be ready for engagement when placed at an AAV engagement location 107. If it is determined that the payload is not ready for engagement, the example routine 800 remains at decision block 810 until the payload is ready for engagement. Once the payload is determined to be ready for engagement, the payload engagement locations are determined, as in 812. As discussed above, payloads may include multiple engagement locations at which the AAV may engage with the payload. In some implementations, the engagement locations may be determined based on the actual center of gravity of the payload that is measured when the center of gravity is placed at the AAV engagement location. In other implementations, the engagement locations may be determined based on the expected payload center of gravity.

Finally, an available AAV with the selected AAV configuration is instructed to navigate to the AAV engagement location where the payload is positioned and engage the payload at the determined engagement location, as in 814. Once engaged, AAV components and/or the payload engagement element may be adjusted using the routines discussed herein to position the center of gravity within a defined position with respect to the AAV. Likewise, if needed, the engagement location may be altered.

Figure 9:
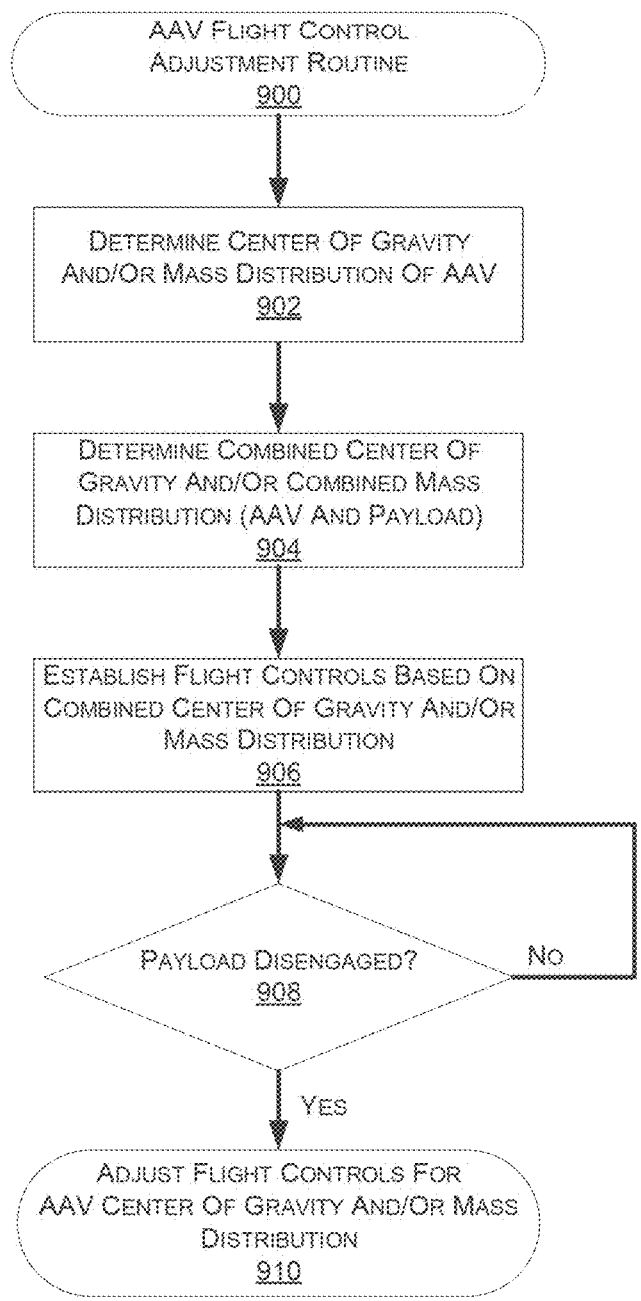
FIG. 9 is a flow diagram of an automated aerial vehicle flight control adjustment routine, according to an implementation.

FIG. 9 is a flow diagram of an AAV flight control adjustment routine 900, according to an implementation. The example routine 900 begins by determining the center of gravity, moment of inertia, and/or mass distribution of the AAV when there is no engaged payload, as in 902. The center of gravity, moment of inertia, and/or the mass distribution of the AAV with no payload may be known and/or stored information. Alternatively, the center of gravity, moment of inertia, and/or mass distribution of the AAV may be determined and/or simulated as discussed herein.

In addition to determining the center of gravity, moment of inertia, and/or mass distribution of the AAV, the center of gravity of the payload to be transported, the mass distribution of the payload to be transported, the moment of inertia of the payload to be transported, the combined center of gravity of the AAV and the payload, the combined moment of inertia of the AAV and the payload, and/or the combined mass distribution of the AAV and the payload is determined, as in 904. Techniques for determining the center of gravity of the payload, the moment of inertia of the payload, the mass distribution of the payload, the combined center of gravity of the AAV and the payload, the combined moment of inertia of the AAV and the payload, and/or the combined mass distribution of the AAV and the payload are discussed above. Based on the determined center of gravity, moment of inertia, and/or mass distribution of the payload or the combined center of gravity, combined moment of inertia, and/or combined mass distribution of the AAV and the payload, flight controls are established to ensure that the AAV safely navigates while engaged with the payload, as in 906. For example, if the payload has a large mass distribution, the degree and/or speed at which the AAV can maneuver may be reduced to ensure that the AAV does not lose control due to the additional mass of the payload. Likewise, the rotational speed of each motor that is needed to hold the AAV and the engaged payload in an approximately stationary and level position may be updated as part of the flight controls based on the determined center of gravity.

As the AAV navigates, the example routine 900 may determine if the payload has been disengaged, as in 908. If the payload has not been disengaged (e.g., delivered), the example routine remains at decision block 908 until the payload is disengaged. Upon determining that the payload has been disengaged, the flight controls and/or the configuration of the AAV may be adjusted to a default or normal state of the AAV with no engaged payload, as in 910. For example, if the AAV adjusted one or more components based on the center of gravity of the payload, once the payload is disengaged, the components may be readjusted to return to a neutral position so that the center of gravity of the AAV without the payload is within the defined position so that the AAV can efficiently travel without the payload. Likewise, the flight controls may be returned to a normal or default state to enable additional speed and/or maneuverability of the AAV.

Figure 10:
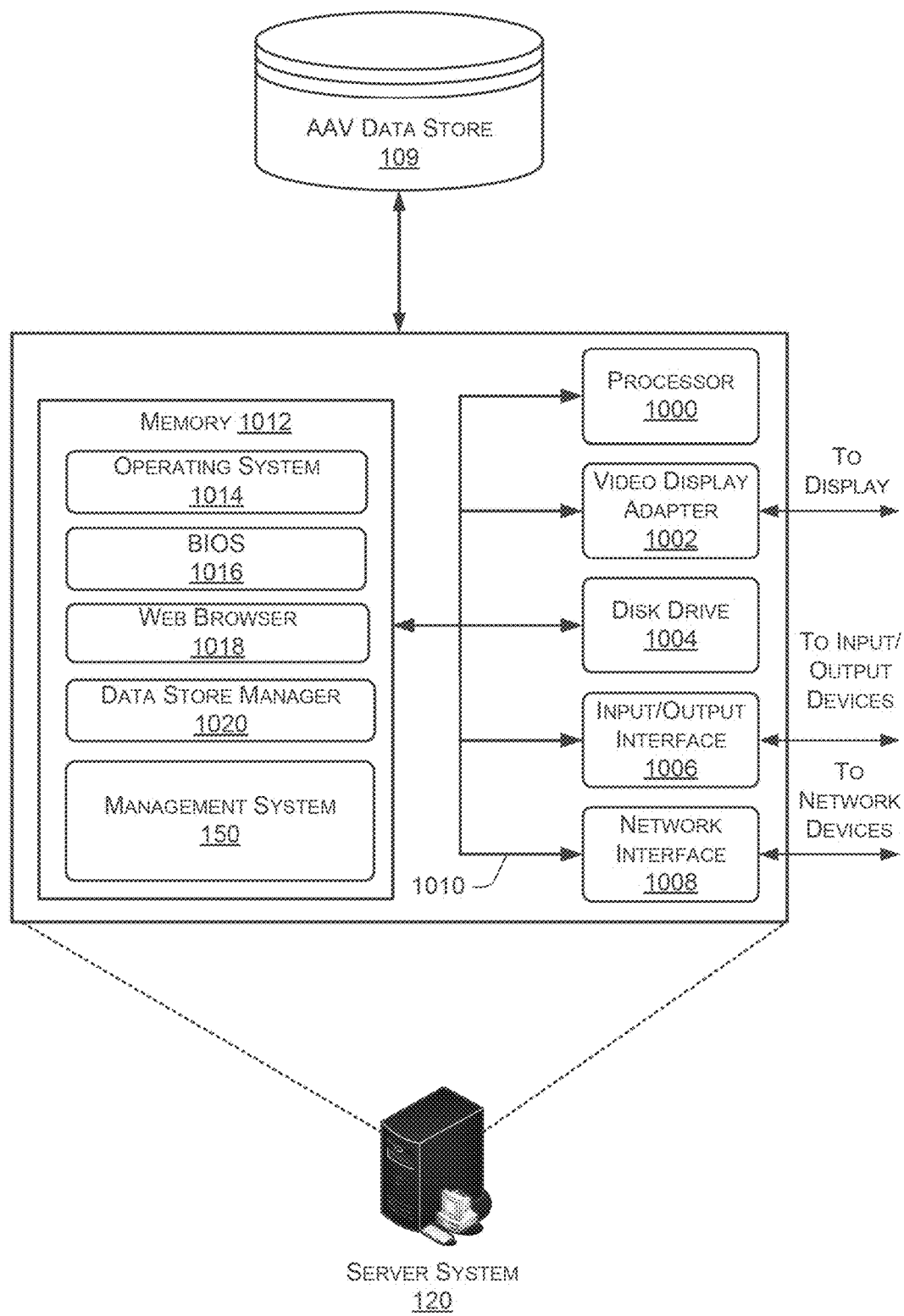
FIG. 10 is a block diagram of an illustrative implementation of a server system that may be used with various implementations.

FIG. 10 is a pictorial diagram of an illustrative implementation of a server system, such as the server system 120, that may be used in the implementations described herein. The server system 120 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an agent of the server system 120 to monitor and configure operation of the server system 120 and/or to provide information (e.g., center of gravity). The input/output interface 1006 likewise communicates with external input/output devices not shown in FIG. 10, such as a mouse, keyboard, scanner, or other input and output devices that can be operated by an agent of the server system 120. The network interface 1008 includes hardware, software, or any combination thereof, to communicate with other computing devices. For example, the network interface 1008 may be configured to provide communications between the server system 120 and other computing devices, such as the AAV 200, via a network.

The memory 1012 generally comprises random access memory (RAM), read-only memory (ROM), flash memory, and/or other volatile or permanent memory. The memory 1012 is shown storing an operating system 1014 for controlling the operation of the server system 120. A binary input/output system (BIOS) 1016 for controlling the low-level operation of the server system 120 is also stored in the memory 1012.

The memory 1012 additionally stores program code and data for providing network services to the AAV 200 and/or the materials handling facility management system 150. Accordingly, the memory 1012 may store a browser application 1018. The browser application 1018 comprises computer executable instructions, that, when executed by the processor 1000, generate or otherwise obtain configurable markup documents such as Web pages. The browser application 1018 communicates with a data store manager application 1020 to facilitate data exchange between the AAV data store 109 and the materials handling facility management system 150.

As used herein, the term "data store" refers to any device or combination of devices capable of storing, accessing and retrieving data, which may include any combination and number of data servers, databases, data storage devices and data storage media, in any standard, distributed or clustered environment. The server system 120 can include any appropriate hardware and software for integrating with the AAV data store 109 as needed to execute aspects of one or more applications for the AAV 200, and/or the materials handling facility management system 150.

The AAV data store 109 can include several separate data tables, databases or other data storage mechanisms and media for storing data relating to a particular aspect. For example, the illustrated AAV data store 109 includes mechanisms for maintaining information related to different AAV configurations, AAV center of gravity information, AAV locations, etc., which can be used to generate and deliver information to AAVs 200, adjust AAV components, and deliver information to the materials handling facility management system 150 and/or agents. It should be understood that there can be many other aspects that may be stored in the AAV data store 109 and that additional data stores beyond the one illustrated may be included. For example, the materials handling facility management system 150 may maintain an inventory data store that includes inventory information (e.g., weight, size, center of gravity, quantity). The AAV data store 109 is operable, through logic associated therewith, to receive instructions from the server system 120 and obtain, update or otherwise process data in response thereto.

The memory 1012 may also include the materials handling facility management system 150, discussed above. The materials handling facility management system 150 may be executable by the processor 1000 to implement one or more of the functions of the server system 120. In one implementation, the materials handling facility management system 150 may represent instructions embodied in one or more software programs stored in the memory 1012. In another implementation, the materials handling facility management system 150 can represent hardware, software instructions, or a combination thereof.

The server system 120, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An aerial vehicle, comprising:
   a frame;
   a power module coupled to the frame;
   a payload engagement element coupled to the frame for engaging and disengaging a payload; and
   a memory coupled to a processor and storing program instructions that when executed by the processor causes the processor to at least:
   determine a first center of gravity, a first moment of inertia, or a first mass distribution of a combined payload and the aerial vehicle;
   establish a first set of flight controls specifying operating parameters for the aerial vehicle while the payload is engaged by the payload engagement element of the aerial vehicle, wherein:
   the first set of flight controls are based at least in part on the first center of gravity, the first moment of inertia, or the first mass distribution; and
   the first set of flight controls limit at least one of a maneuverability of the aerial vehicle or a speed of the aerial vehicle compared to a default set of flight controls in which at least one of the maneuverability of the aerial vehicle or the speed of the aerial vehicle is not limited;
   cause the aerial vehicle to operate according to the first set of flight controls while the payload is engaged by the aerial vehicle;
   determine that the payload has been disengaged by the payload engagement element of the aerial vehicle; and
   in response to a determination that the payload has been disengaged, cause the aerial vehicle to operate according to the default set of flight controls, the default set of flight controls based at least in part on a default center of gravity, a default moment of inertia, or a default mass distribution of the aerial vehicle.

2. The aerial vehicle of claim 1, further comprising:
   a center of gravity adjustment mechanism configured to adjust a position of at least one of the power module, a counterweight, or a rigid member of the aerial vehicle to alter the first center of gravity, first moment of inertia, or first mass distribution.

3. The aerial vehicle of claim 2, wherein the program instructions further cause the processor to at least:
   send instructions that cause the center of gravity adjustment mechanism to position in a first position at least one of the power module, the counterweight, or the rigid member while the payload is engaged by the aerial vehicle.

4. The aerial vehicle of claim 3, wherein the program instructions further cause the processor to at least:
   in response to the determination that the payload has been disengaged, send instructions that cause the center of gravity adjustment mechanism to adjust a position of at least one of the power module, the counterweight, or the rigid member from the first position to a default position.

5. The aerial vehicle of claim 1, wherein the first center of gravity, the first moment of inertia, or the first mass distribution is determined based at least in part on a second center of gravity of the payload, a second moment of inertia of the payload, or a second mass distribution of the payload and the default center of gravity of the aerial vehicle, the default moment of inertia of the aerial vehicle, or the default mass distribution of the aerial vehicle.

6. The aerial vehicle of claim 1, wherein the first set of flight controls are established prior to an aerial transport of the payload.

7. A computer-implemented method to alter an operation of an aerial vehicle, comprising:
   under control of one or more computing systems configured with executable instructions, determining a combined center of gravity of a payload and an aerial vehicle;
   establishing a first set of flight controls for the aerial vehicle while the payload is engaged by the aerial vehicle, wherein:
   the first set of flight controls are established based at least in part on the combined center of gravity; and
   the first set of flight controls limit at least one of a maneuverability of the aerial vehicle or a speed of the aerial vehicle compared to a default set of flight controls in which at least one of the maneuverability of the aerial vehicle or the speed of the aerial vehicle is not limited;
   instructing the aerial vehicle to operate according to the first set of flight controls while the payload is engaged by the aerial vehicle; and instructing the aerial vehicle to operate according to the default set of flight controls while the payload is not engaged by the aerial vehicle, wherein the default set of flight controls is determined based at least in part on a center of gravity of the aerial vehicle.

8. The computer-implemented method of claim 7, wherein the combined center of gravity is determined based at least in part on an expected center of gravity of the payload and a known center of gravity of the aerial vehicle.

9. The computer-implemented method of claim 8, wherein the expected center of gravity is further based at least in part on an item included in the payload, a position of engagement between the payload and the aerial vehicle, or a simulation.

10. The computer-implemented method of claim 7, wherein the combined center of gravity is determined based at least in part on a position of the payload when engaged by the aerial vehicle.

11. The computer-implemented method of claim 7, wherein the combined center of gravity is determined based at least in part by measuring a mass of the aerial vehicle and the payload with a plurality of sensors.

12. The computer-implemented method of claim 7, wherein the payload includes an item ordered from an e-commerce website that is to be delivered to a destination using the aerial vehicle.

13. The computer-implemented method of claim 7, wherein the aerial vehicle is configured to at least:
 engage the payload; and
 adjust a position of the engaged payload with respect to the aerial vehicle or adjust a position of a component of the aerial vehicle.

14. The computer-implemented method of claim 13, wherein the component is at least one of a power supply, an adjustable motor arm, a payload engagement element, or a counterweight.

15. The computer-implemented method of claim 7, wherein the first set of flight controls indicate a rotational speed of each motor of the aerial vehicle needed to hold the aerial vehicle and the payload in an approximately stationary and level position.

16. A system to transport a payload, comprising:
 an aerial vehicle having a frame and a payload engagement element coupled to the frame and configured to engage the payload; and
 a memory coupled to a processor and storing program instructions that when executed by the processor cause the processor to at least:
  receive a first set of flight controls, wherein the first set of flight controls limit at least one of a maneuverability of the aerial vehicle or a speed of the aerial vehicle compared to a default set of flight controls in which at least one of the maneuverability of the aerial vehicle or the speed of the aerial vehicle is not limited;
  cause the aerial vehicle to aerially navigate with the payload according to the first set of flight controls;
  determine that the payload has been disengaged by the aerial vehicle; and
  cause the aerial vehicle to aerially navigate without the payload according to the default set of flight controls.

17. The system of claim 16, wherein the first set of flight controls is determined based at least in part on one or more of a combined center of gravity of the aerial vehicle and the payload, a combined moment of inertia of the aerial vehicle and the payload, or a combined mass distribution of the aerial vehicle and the payload.

18. The system of claim 16, further comprising:
 a payload container configured with a plurality of engagement locations to receive and to engage the payload engagement element of the aerial vehicle; and
 wherein the aerial vehicle includes a center of gravity adjustment controller configured to determine an engagement location between the payload engagement element and the payload based at least in part on a determined center of gravity of the payload.

19. The system of claim 18, wherein:
 a combined center of gravity of the aerial vehicle and the payload, a combined moment of inertia of the aerial vehicle and the payload, or a combined mass distribution of the aerial vehicle and the payload is determined based at least in part on the engagement location; and
 the first set of flight controls is determined based at least in part on one or more of the combined center of gravity, the combined moment of inertia, or the combined mass distribution.

20. The system of claim 16, further comprising:
 an engagement location at which the payload is placed for engagement by the aerial vehicle;
 a plurality of sensors positioned at the engagement location and configured to measure a mass of the payload when placed at the engagement location; and
 wherein the program instructions further include instructions that cause the processor to at least:
  receive from each of the plurality of sensors, mass information corresponding to a mass measured by each respective sensor when the payload is placed at the engagement location; and
  determine, based at least in part on the mass information received from each of the plurality of sensors, the center of gravity of the payload.

* * * * *